US006892292B2

(12) United States Patent
Henkel et al.

(10) Patent No.: US 6,892,292 B2
(45) Date of Patent: May 10, 2005

(54) APPARATUS FOR ONE-CYCLE DECOMPRESSION OF COMPRESSED DATA AND METHODS OF OPERATION THEREOF

(75) Inventors: Joerg Henkel, Plainsboro, NJ (US); Haris Lekatsas, Princeton, NJ (US); Venkata Jakkula, Monmouth Jct., NJ (US)

(73) Assignee: NEC Corporation, Tokyo (JP)

( * ) Notice: Subject to any disclaimer, the term of this patent is extended or adjusted under 35 U.S.C. 154(b) by 441 days.

(21) Appl. No.: 10/135,575

(22) Filed: May 1, 2002

(65) Prior Publication Data

US 2003/0131216 A1 Jul. 10, 2003

Related U.S. Application Data

(60) Provisional application No. 60/346,002, filed on Jan. 9, 2002, and provisional application No. 60/359,692, filed on Feb. 27, 2002.

(51) Int. Cl.[7] .............................................. G06F 5/00
(52) U.S. Cl. .................................................... 712/200
(58) Field of Search ........................................ 712/200

(56) References Cited

U.S. PATENT DOCUMENTS

| | | | | |
|---|---|---|---|---|
| 5,455,576 A | * | 10/1995 | Clark et al. .................... 341/50 |
| 5,534,861 A | * | 7/1996 | Chang et al. ................... 341/79 |
| 5,654,806 A | * | 8/1997 | Truong ......................... 382/246 |
| 5,872,530 A | * | 2/1999 | Domyo et al. ................ 341/106 |
| 5,883,975 A | * | 3/1999 | Narita et al. ................. 382/232 |
| 5,894,300 A | * | 4/1999 | Takizawa ..................... 345/601 |
| 6,049,862 A | * | 4/2000 | Bauer et al. .................. 712/208 |
| 6,466,144 B1 | * | 10/2002 | Cooper ........................ 341/106 |
| 6,549,995 B1 | * | 4/2003 | Schulz et al. ................. 711/202 |
| 6,633,969 B1 | * | 10/2003 | Lin ............................. 712/210 |
| 6,657,569 B2 | * | 12/2003 | Barnett ......................... 341/65 |
| 6,763,031 B1 | * | 7/2004 | Gibson et al. ................ 370/428 |
| 6,765,509 B2 | * | 7/2004 | Jones et al. .................... 341/51 |

OTHER PUBLICATIONS

C. Lefurgy, E. Piccininni and T. Mudge, *Reducing Code Size with Run–time Decompression,* Proc. of the International Symposium of High–Performance Computer Architecture (Jan. 2000).

Wolfe and A. Chanin, *Executing Compressed Programs on an Embedded RISC Architecture,* Proc. of the International Symposium on Microarchitecture, pp. 81–91 (Dec. 1992).

L. Benini, A. Maci, E, Macu and M. Poncino, *Selective Instruction Compression for Memory Energy Reduction in Embedded Systems,* IEEE/ACM Proc. of International Symposium on Low Power Electronics and Design (ISLPED '99), pp. 206–211 (1999).

S.Y. Liao, S. Devadas and K. Keutzer, *Code Density Optimization for Embedded DSP Processors Using Data Compression Techniques,* Proceedings of the Chapel Hill Conference on Advanced Research in VLSI, pp. 393–399 (1995).

(Continued)

*Primary Examiner*—Eric Coleman
(74) *Attorney, Agent, or Firm*—Sughrue Mion, PLLC

(57) ABSTRACT

Code compression is known as an effective technique to reduce instruction memory size on an embedded system. However, code compression can also be very effective in increasing the processor-to-memory bandwidth and hence provide increased system performance. A code decompression engine having plurality of dictionary tables, coupled with decoding circuitry and appropriate control circuitry, is coupled between the processor core and the instruction cache. The code decompression engine provides one-cycle decompression of compressed instructions that are intermixed with uncompressed instructions, thereby increasing processor-to-memory bandwidth and avoiding processor stalls.

30 Claims, 10 Drawing Sheets

OTHER PUBLICATIONS

T. Okuma, H. Tomiyama, A. Inoue, E. Fajar and H. Yasuura, *Instruction Encoding Techniques for Area Minimization of Instruction ROM,* International Symposium on System Synthesis, pp. 125–130 (Dec. 1998).

Y. Yoshida, B.-Y. Song, H. Okuhata and T. Onoye, *An Object Code Compression Approach to Embedded Processors,* Proc. of the International Symposium on Low Power Electronics and Design (ISLPED), ACM: 265–268 (Aug. 1997).

* cited by examiner

| CASE | BITS (3 DOWN TO 0) | DESCRIPTION |
|---|---|---|
| 1 | 1110 | 24->8 BITS |
| 2 | 1111 | 24->16 BITS |
| 3 | 1xxx (EXCEPT FOR 1111 OR 1110) | 16 BIT INSTR. |
| 4 | 0xxx | 24 BIT INSTR. |

| PREV_DECOMP LENGTH | PREV_COMP LENGTH |
|---|---|
| 2 | 3 |
| 2 | 2 |
| 1 | 3 |
| 2 | 1 (24->8) |
| 1 | 2 (24->8 + X) |
| 1 | 2 (24->16) |
| 0 | 3 (24->8 + 24->16) |
| 0 | 3 (24->8 + 16(n)) |
| 0 | 3 (24->8 + 16(part of uncomp. 24)) |
| 1 | 1 (24->8) |

*FIG. 10*

```
40014F30   l32r     a8,40014a74
40014F33   movi.n   a9,0
40014F35   s32i     a9, a8, 0
40014F38   movi.n   a8,0
40014F3A   movi.n   a7,0
40014F3C   retw
```

`US 6,892,292 B2`

APPARATUS FOR ONE-CYCLE DECOMPRESSION OF COMPRESSED DATA AND METHODS OF OPERATION THEREOF

CROSS-REFERENCES TO RELATED APPLICATIONS

This application is an application filed under 35 U.S.C. § 111(a), claiming benefit pursuant to 35 U.S.C. § 119(e) of the filing date of the Provisional Application Ser. No. 60/346,002 filed on Jan. 9; 2002, pursuant to 35 U.S.C. § 111(b) and claiming benefit pursuant to 35 U.S.C. § 119(e) of the filing date of the Provisional Application Ser. No. 60/359,692 filed on Feb. 27, 2002, pursuant to 35 U.S.C. § 111(b). The Provisional Application Serial No. 60/346,002 and Provisional Application Ser. No. 60/359,692 are incorporated herein by reference for all they disclose.

BACKGROUND OF THE INVENTION

1. Technical Field of the Invention

This invention is related to an apparatus for executing one-cycle decompressions of compressed and uncompressed software instructions. More specifically, the invention processes compressed software instructions using a decompression tree and a dictionary and the decompressed software instructions are forwarded instructions to a processor without requiring any processor stalls.

2. Description of the Related Art

The following papers provide useful background information on the indicated topics, all of which relate to the invention and are incorporated herein by reference:

T. C. Bell, J. G. Cleary and I. H. Witten, *Text Compression*, Prentice Hall, N.J. (1990).

L. Benini, A. Maci, E. Macu and M. Poncino, *Selective Instruction Compression for Memory Energy Reduction in Embedded Systems*, IEEE/ACM Proc. of International Symposium on Low Power Electronics and Design (ISLPED '99), pgs. 206–11 (1999).

IBM CodePack PowerPC Code Compression Utility User's Manual, Version 3.0 (1998).

N. Ishiura and M. Yamaguchi, *Instruction Code Compression for Application Specific VLIW Processors Based on Automatic Field Partitioning*, Proc. of the Workshop on Synthesis and System Integration of Mixed Technologies, pgs. 105–9 (1998).

C. Lefurgy and T. Mudge, *Code Compression for DSP*, CSE-TR-380-98, University of Michigan (November 1998).

C. Lefurgy, E. Piccininni and T. Mudge, *Reducing Code Size with Run-time Decompression*, Proc. of the International Symposium of High-Performance Computer Architecture (January 2000).

S. Y. Liao, S. Devadas and K. Keutzer, *Code Density Optimization for Embedded DSP Processors Using Data Compression Techniques*, Proceedings of the Chapel Hill Conference on Advanced Research in VLSI, pgs. 393–99 (1995).

T. Okuma, H. Tomiyama, A. Inoue, E. Fajar and H. Yasuura, *Instruction Encoding Techniques for Area Minimization of Instruction ROM*, International Symposium on System Synthesis, pgs. 125–30 (December 1998).

A. Wolfe and A. Chanin, *Executing Compressed Programs on an Embedded RISC Architecture*, Proc. of the International Symposium on Microarchitecture, pgs. 81–91 (December 1992).

Y. Yoshida, B. -Y. Song, H. Okuhata and T. Onoye, *An Object Code Compression Approach to Embedded Processors*, Proc. of the International Symposium on Low Power Electronics and Design (ISLPED), ACM: 265–268 (August 1997).

There will now be provided a discussion of various topics to provide a proper foundation for understanding the invention.

Designers in the high volume and cost-sensitive embedded systems market face many design challenges as the market demands single-chip-solutions to meet constraints like lower system cost, higher functionality, higher level of performance and lower power-consumption requirements for increasingly complex applications.

Code compression/decompression has emerged as an important field to address parts of these problems in embedded system designs. Typically, a system that runs compressed code is decompressing the compressed code as it is needed by the CPU. The decompression can be performed outside the CPU (e.g., between the L2 cache and main memory or between the L2 cache and CPU) or inside the CPU as part of the instruction fetch unit or decoding unit. In any case, only parts of the whole code will be decompressed (i.e., on an instruction-level or block-level) in order to minimize the memory requirements. The code is being compressed as a step following code compilation and then it is burned into flash memory or ROM, from where it loaded during system reset into the main memory or the L2 cache. That implies that the software cannot be changed and must be fixed. Note that this characteristic prohibits the system to conduct any kind of technique using self-modifying code. If, however, the software application does change, then the code has to be compressed again, and the flash memory or ROM has to be burned again. Typically, this is not a problem for embedded systems that do not allow the user to make software changes, e.g., cellular telephones.

The primary goal in code compression has traditionally been to reduce the instruction memory size, although newer approaches have shown that it can even lead to performance increases of an embedded system. As used herein, the terms "compression" or "decompression" denote a technology that runs code that has been compressed before the system runs and where code is being decompressed when the system runs, i.e., on-the-fly.

Application areas for code compression/decompression are embedded systems in the areas of personal wireless communication (e.g., cellular telephones), personal computing (e.g., PDAs), personal entertainment (e.g., MPEGIII players) and other embedded systems where memory size and performance is a constraint.

Wolfe and Chanin developed the Compressed Code RISC Processor (CCRP), which was the first system to use cache-misses to trigger decompression. Their decompression engine is designed as part of the cache refill hardware. The instructions in each L1 cache block are Huffman encoded separately so that each block can be individually decompressed without requiring decompression of other blocks in advance. As Huffman codes are variable length codes, decoding is not as fast as with dictionary methods. Since the fixed-length cache blocks are compressed to variable-length blocks, an index table is required to map native cache-miss addresses to compressed code addresses. This requires the decompression engine to conduct one more level of lookup to find the data.

CodePack is used in IBM's embedded PowerPC systems. Their scheme resembles CCRP in that it is part of the memory system. The CPU is unaware of compression and a device similar to a Line Address Table (LAT) maps between the native and compressed address spaces. The decompression engine accepts the L1 cache miss addresses, retrieves the corresponding compressed bytes from main memory, decompresses them and returns native PowerPC instructions to the L1 cache. CodePack achieves 60% compression ratio on a PowerPC. IBM reports that performance change in compressed code is within 10% of native programs—sometimes with speedup. A speedup is possible because CodePack implements pre-fetching behavior that the underlying processor does not have.

Software decompression is also possible, simplifying the hardware design and allowing the decompression to be selected at run-time. The hardware is simplified because the decompression software uses the arithmetic unit in the processor core, rather than having separate and highly specialized logic structures. Lefurgy et al. proposed two hardware mechanisms to support software decompression. First, a L1 cache miss triggers a cache miss exception that runs the decompression program. Second, a privileged instruction used by the decompression program stores decompressed instructions directly into the instruction cache. The decompression software is not compressed and is stored in a region of memory that does not cause a decompression exception. Liao et al. proposed a dictionary method that can be accomplished purely in software, where mini-subroutines are introduced replacing frequently appearing code fragments.

Ishiura and Yamaguchi proposed a compression scheme for VLIW processors based on automated field partitioning. The compression scheme keeps the size of the decompression tables small by producing codes for sub-fields of instructions. Benini et al. limit the dictionary size by selectively compressing instructions. Lefurgy et al. also proposed a dictionary scheme used in their DSP compression work. Okuma et al. proposed an interesting encoding technique that takes into account fields within instructions. Yoshida et al. proposed a logarithmic-based compression scheme that can result in power reduction as well.

An important problem associated with code compression is how to locate branch/jump/call targets in compressed code since the original offsets will not point to "correct" locations after compression. A compressed program must be decompressed in sections determined by the flow of control through the program; decompressing the entire program before execution begins would defeat the purpose of code compression. This means that there should exist several points in the program where decompression can start without having decompressed any previous parts of the binary code. The frequency of these resynchronization points determines the block size, which is a uniquely decompressible piece of code. Some methods do not have constant block sizes, while others enforce a constant block size that can be anything from a single instruction, to a cache line, or even a page. It is important to understand that the block size refers to the uncompressed data and not to the compressed. In the invention, the block size is equal to the size of one instruction and is variable-size in the general case (since native instructions can be variable-size).

The decompressor is responsible for locating the compressed data for a requested instruction. It must map the native address of a requested instruction to the address where the compressed data is located. Techniques for implementing this mapping are described below.

The most widely used method to solve the indexing problem is to build a table that maps native addresses (addresses of instructions in the original code) to addresses in compressed code. Wolfe and Chanin were the first to propose such a method in which a Line Address Table (LAT) was used to map the address of cache lines to their address in the compressed code. Since Wolfe and Chanin's design used cache lines as their decompressible units, they only need to store addresses of beginnings of compressed lines and not branch targets. Storing a full pointer for each cache line would result in a large LAT, hence they proposed a method to compact pointers by storing one base address and a number of compressed cache line offsets in each LAT entry. To get the compressed address of a cache line, several offset fields must be added to the base address. These offsets are interpreted as byte-aligned offsets from the base address since all compressed blocks (cache lines) are byte-aligned to simplify decoding.

A drawback of the LAT approach is that the table introduces a significant amount of overhead for small blocks. Increasing the number of offsets per LAT entry can help, but makes the address calculation slower.

Another technique is to use an equation to calculate addresses in the compressed space. The easiest way to achieve this is to have a constant block size and to ensure all blocks are compressed to the same compressed size. This is a fixed-to-fixed coding scheme (F—F) and is generally not very efficient in terms of compression ratio. The most straightforward way to do this is to collect statistics of bit patterns in fixed-size blocks and re-encode with fewer bits depending on how many bit patterns combinations occur. For example if the block size is 32 bits, but only $2^{24}$ combinations appear, and only 24 bits are needed to encode these blocks. However, a table that maps these different bit patterns to their original 32-bit sizes is required making this method impractical. This can be improved by splitting the original 32-bit block into sub-blocks and having a significantly smaller table for each sub-block.

SUMMARY OF THE INVENTION

The invention has been made in view of the above circumstances and to overcome the above problems and limitations of the prior art.

A first aspect of the invention provides a one-cycle decompression engine, the decompression engine for compressed and uncompressed software instructions. The decompression engine comprises means for decoding input data, wherein the input data is compressed and uncompressed software instructions. The decompression engine further comprises means for storing decoded instructions that are coupled to the means for decoding. Typically, these means are used to store uncompressed instructions that correspond to a particular compressed instruction. The decompression engine also has output means coupled to the means for decoding and to the means for storing decoded instructions. The output means is used to output decoded and uncompressed software instructions to a processing unit. Finally, the decompression engine comprises means for storing coupled to the means for decoding and to the output means. The means for storing stores various flags and portions of compressed or uncompressed instructions.

A second aspect of the invention provides a one-cycle decompression engine that comprises a decoding circuit and at least two dictionary tables coupled to the decoding circuit. The dictionary tables store uncompressed instructions that correspond to certain compressed software instructions. The decompression engine further comprises an output register coupled to the decoding circuit and to the dictionary tables. The output register outputs the uncompressed instructions to a processing unit for execution. The decompression engine further comprises a plurality of registers coupled to the decoding circuit and to the output register. These registers are used for storing various flags and portions of compressed or uncompressed instructions.

A third aspect of the invention provides a method for maintaining instruction counter coherency during decompression of compressed software instructions. The method comprises determining if an uncompressed instruction is a predetermined type of instruction, and based on that determination, storing a decompression program counter in a predetermined memory location. Next, the method determines if the processor program counter is greater than the decompression program counter, and if that determination is true, incrementing the decompression program counter. After examining the processor program counter, the method next determines if the processor program counter offset points to a replay buffer address, and if that determination is true, the method changes the decompression engine program counter to be equal to the replay buffer address.

A fourth aspect of the invention is a method for handling compressed and uncompressed software instructions of various bit sizes using a decompression tree. First, the method constructs a decompression tree having a root and a plurality of branches extending from the root, with each branch having a branch end. The location of the branch ends is based on a predetermined total bit size for compressed and uncompressed software instructions. Next, the method receives two software instructions at the root of the decompression tree. The bit size of the first software instruction is determined, and a branch of the decompression tree corresponding to the bit size of the first software instruction is traversed. Next, the method determines the bit size of the second software instruction, and traverses the decompression tree down a branch that corresponds to the bit size of the second software instruction. After traversing the second branch, the method determines if a branch end has been reached, and if that determination is true, decodes the software instructions. If a branch end has not been reached, the method receives additional software instructions until a branch end is reached.

BRIEF DESCRIPTION OF THE DRAWINGS

The accompanying drawings, which are incorporated in and constitute a part of this specification illustrate aspects of the invention and, together with the written description, serve to explain the aspects, advantages and principles of the invention. In the drawings.

FIG. 10 illustrates program counter differences between compressed and uncompressed instructions using an exemplary instruction bit width;

DETAILED DESCRIPTION OF THE INVENTION

Figure 1:
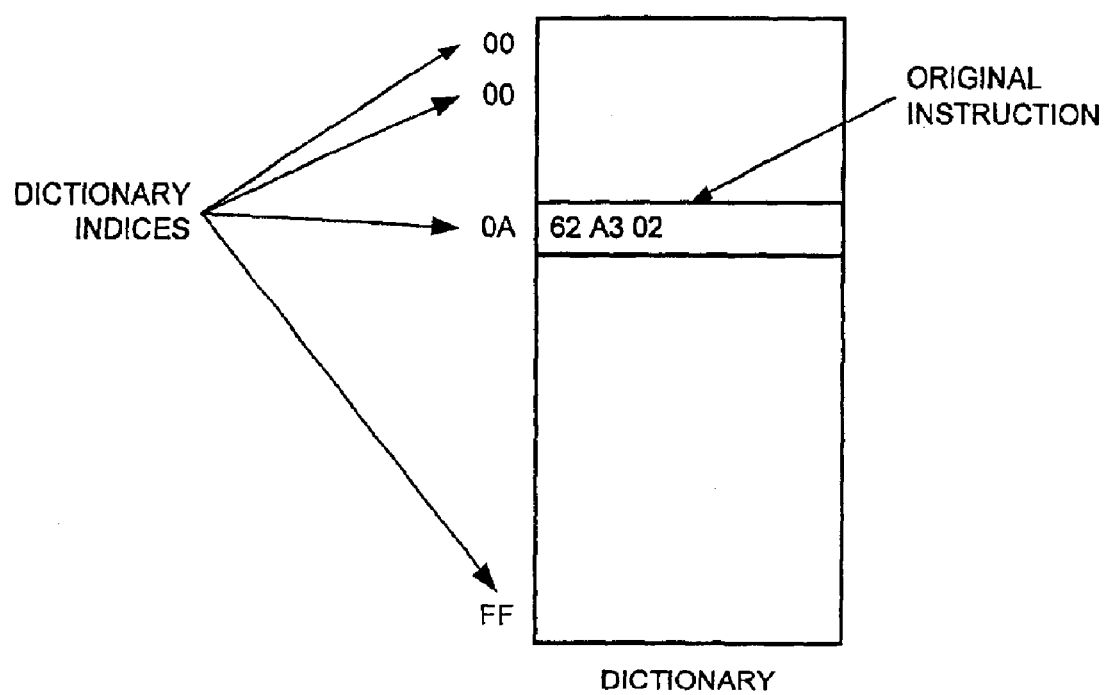
FIG. 1 illustrates an exemplary dictionary table.

Prior to describing the aspects of the invention, some details concerning the prior art will be provided to facilitate the reader's understanding of the invention and to set forth the meaning of various terms.

As used herein, the term "computer system" encompasses the widest possible meaning and includes, but is not limited to, standalone processors, networked processors, mainframe processors and processors in a client/server relationship. The term "computer system" is to be understood to include at least a memory and a processor. In general, the memory will store, at one time or another, at least portions of executable program code, and the processor will execute one or more of the instructions included in that executable program code.

It will be appreciated that the term "predetermined operations," the term "computer system software," and the term "executable code" mean substantially the same thing for the purposes of this description. It is not necessary to the practice of this invention that the memory and the processor be physically located in the same place. That is to say, it is foreseen that the processor and the memory might be in different physical pieces of equipment or even in geographically distinct locations.

As used herein, one of skill in the art will appreciate that "media" or "computer-readable media" may include a diskette, a tape, a compact disc, an integrated circuit, a cartridge, a remote transmission via a communications circuit, or any other similar medium useable by computers. For example, to distribute computer system software, the supplier might provide a diskette or might transmit the instructions for performing predetermined operations in some form via satellite transmission, via a direct telephone link, or via the Internet.

Although computer system software might be "written on" a diskette, "stored in" an integrated circuit, or "carried over" a communications circuit, it will be appreciated that, for the purposes of this discussion, the computer usable medium will be referred to as "bearing" the instructions for performing predetermined operations. Thus, the term "bearing" is intended to encompass the above and equivalent ways in which instructions for performing predetermined operations are associated with a computer usable medium.

Therefore, for the sake of simplicity, the term "program product" is hereafter used to refer to a computer useable medium, as defined above, which bears instructions for performing predetermined operations in any form.

A detailed description of the aspects of the invention will now be given referring to the accompanying drawings.

The invention can be summarized by the following:
1. The decompression engine is placed between instruction cache and CPU.
2. The decompression engine is generic, i.e., it works with any instruction set architecture (even if the instruction length is not fixed).

3. As an implication to (1), the decompression engine has to be able to decompress compressed instructions in just one cycle.

The basic functionality and architecture of the system into which the decompression engine is embedded such that the main memory contains the code that has been compressed in a post-compilation step. Upon an instruction cache miss, blocks of compressed code are loaded into the instruction cache. When the CPU requests a certain instruction word, the instruction cache sends this compressed word to the decompression engine. The decompression engine decompresses the instruction word on-the-fly in one cycle. The decompression engine is generic, since it does not assume a certain instruction set and it does not assume a fixed instruction length.

Though table-based dictionary encoding is a well-known compression technique, advanced architectural design strategies are necessary to meet the one-cycle design constraint for the architecture of the present invention. A summary of design constraints follows:

1. Decompressing a compressed instruction word(s) in one cycle.
2. Meeting the clock cycle delay budget.
3. No modification to the CPU should be necessary. That means the decompression engine has to interface to the CPU and to the memory hierarchy such that both CPU and memory hierarchy are not aware of the existence of the decompression engine, i.e., the decompression engine interfaces to the CPU like the memory hierarchy and it interfaces to the memory hierarchy like the CPU.
4. The decompression engine should be considerably smaller than the CPU, since the decompression engine circuitry for a one-cycle decompression is typically larger compared to a case where one-cycle decompression is not an issue.

The decompression engine interfaces have been designed for a commercial CPU core. A list of characteristics that represent especially challenging features of CPU cores with respect to the one-cycle decompression constraints follows:

1. Instructions can have multiple different formats, e.g., 16-bit and 24-bit instruction words.
2. The instruction data fetched from memory is not necessarily aligned on instruction boundaries.
3. The CPU program counter cannot be used to gauge the program flow.
4. There is no mechanism to stall the CPU without side effects. A full 32-bit word (which is more than one instruction) has to be delivered to the CPU.

The invention uses a dictionary technique to compress frequently appearing instructions (according to program statistics). Dictionary coding refers to a class of compression methods that replace sequences of symbols with indices to a table. This table is called the "dictionary". The indices are the code-words in the compressed program. An entry in the dictionary holds either an original symbol or a sequence of symbols. This encoding reduces the data if the indices are shorter than the replaced symbols and if the dictionary is compact. The main advantage is that the indices are usually of fixed-length and thus simplify the decompression logic to access the dictionary, as well as reducing decompression latency.

Referring to FIG. 1, the dictionary compression algorithm is illustrated. For example, assume that the instruction 0x62A302 appears frequently in the executable code. The instruction is replaced by the index 0x0A, thereby saving two bytes of memory space. Preferably, the invention uses a dictionary table of 256 entries, since this is a good compromise between compression ratio and table size. Preferably, the dictionary table is duplicated in order to enable simultaneous decoding of two compressed instructions per cycle. This is more efficient than using a dual-port register file (i.e., a 32-bit data word can comprise up to two instructions according to the instruction format). Due to the limited size of the dictionary table, some instructions of the code are left uncompressed.

The present invention can use several bit encodings for instruction words. For example, a commercial processor may use 24-bit instructions, and those 24-bit instructions can be compressed into 8-bit codes and 16-bit codes. For 8-bit codes, the whole code word is used to index the decompression table. For 16-bit codes, the 8 MSB bits are used to access the decompression table, while the 8 LSB bits are used to signal the type of instruction. The types can entirely be derived from the 4 LSB bits of any instruction.

Figures 2, 3:
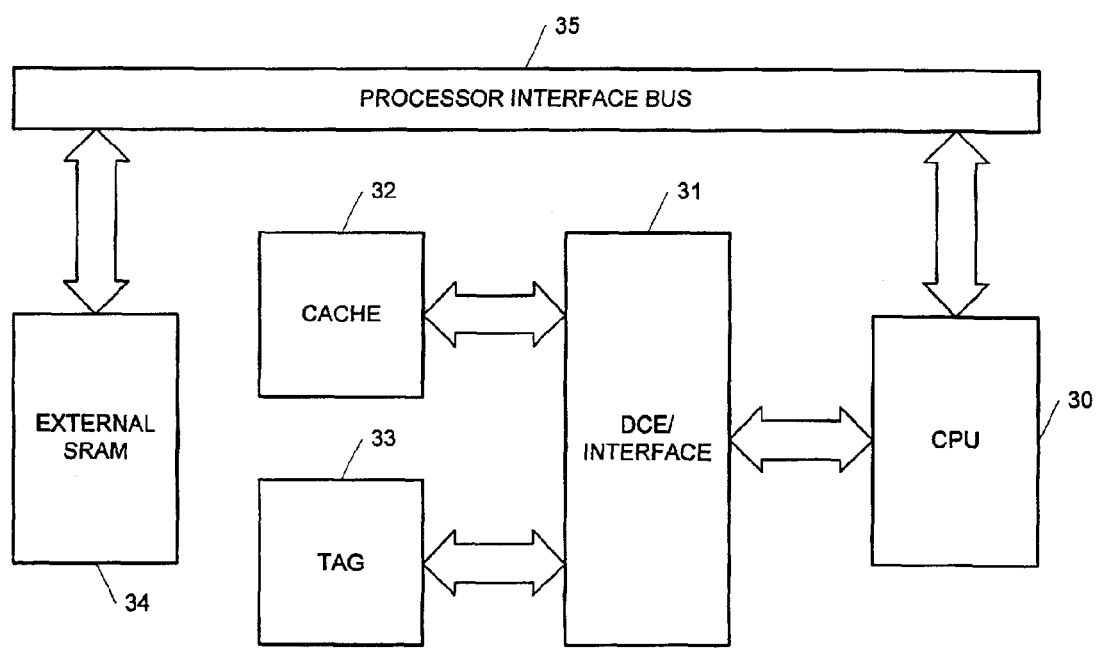
FIG. 2 illustrates an exemplary encoding convention.
FIG. 3 illustrates an embodiment of the present invention.

Referring to FIG. 2, a set of exemplary encoding conventions are illustrated. The exemplary encoding conventions guarantee that differentiation between compressed and uncompressed instructions can be accomplished, and decompression is done when necessary only.

Referring to FIG. 3, a high-level system architecture that incorporates a decompression engine located between the cache and CPU is illustrated. The commercial CPU 30 interfaces with the memory 34 via the processor interface bus 35. The memory 34 stores the compressed executable code and the memory 34 can comprise flash memory, EEPROM, SRAM, ROM or any kind of memory device that can store instruction code. The decompression engine 31 interfaces between the instruction cache 32 and the CPU 30. The TAG 33 is the storage area for the instruction cache 32, and is used to determine if the instruction cache 32 the data requested by the CPU 30. When the CPU 30 places an address on the processor interface bus 35 and requests data from this address, the TAG 33 is checked to see if the data is in the instruction cache 32. If an entry in the TAG 33 matches the address requested, it is a cache hit and the instruction cache 32 is accessed. If not, it is a cache miss and memory 34 must be accessed. The decompression engine 31 accesses the TAG 33 directly by intercepting its communications with the CPU 30. This way the decompression engine 31 can control the cache miss/hit signals.

Figure 4:
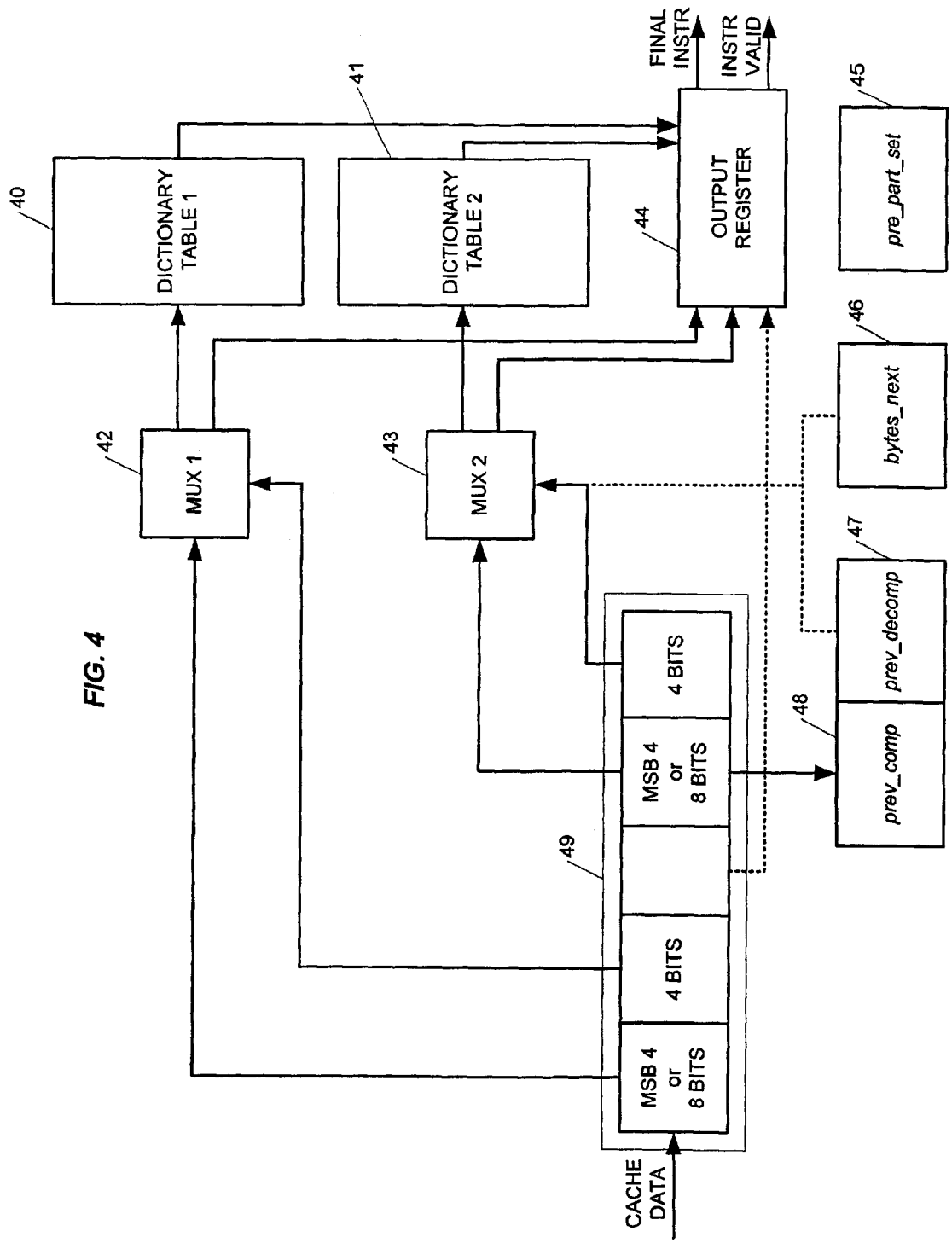
FIG. 4 illustrates an embodiment of a decompression engine according to the present invention.

Referring to FIG. 4, an exemplary embodiment of a decompression engine according to the invention is illustrated. The exemplary embodiment can process instruction words for a commercial processor that has two types of instructions: 24-bit and 16-bit instructions. The data fetched from the cache every cycle is 32 bits wide and the compressed instruction words can be either 16 bits or 8 bits wide. Thus, the compressed code consists of three types of instructions: 8-bit (compressed), 16-bit (compressed or uncompressed) and 24-bit (uncompressed).

The decompression engine 31 consists of the decoding logic 49 and two decompression tables 40–41. Preferably, the decompression tables 40–41 are 256 entry SRAMs, and are as wide as the largest uncompressed instruction, i.e., uncompressed 24-bit instructions require a 24-bit wide SRAM. The present invention uses two decompression tables, since at most two compressed instructions can be decoded per cycle. The decoding logic 49 is triggered by the arrival of compressed/uncompressed 32-bit instruction words from the instruction cache 32. The decompression engine 31 examines the bits (depending on the ISA will be in different locations) which form the select bus for the multiplexers 42–43 and determine the type of the instruction. The output of the decompression tables 40–41 and the decoding logic 49 is coupled to the 32-bit output register 44.

The prev_decomp register 47 holds previously decompressed instruction data. For example, if the decompression engine decompresses two 16-bit instructions into their original 24-bit sizes, that will exceed the 32-bit limit of the CPU. The remaining 16 bits of the second decompressed instruction are stored in the prev_decomp register 47 for use in the next cycle. The prev_decomp register 47 is also connected to the output register 44.

The prev_comp register 48 holds previously compressed data. This register is used when it is not possible to decompress the whole instruction in the current cycle because part of it belongs to the next word. Thus, it is necessary to store the part of the compressed instruction that is available in the current cycle in the prev_comp register 48. A pre_part_set register 46 is used to indicate that there is a portion of the previous instruction stored.

Bytes to be sent directly from the next compressed data stream are held in the bytes_next register 45. For example, consider the case where there are two 24-bit uncompressed instructions. Since the decompression engine 31 can only receive and produce 32 bits, it will only receive eight bits of the second instruction from the cache. The bits needed to decode this instruction are always held in the first four bits. Therefore, it is possible to know the type of the instruction but it is impossible to send more than eight bits. The bytes_next register 45 is used to inform the decompression engine 31 that it needs to forward the next two bytes directly to the CPU in the next cycle without any decoding. Decoding would be impossible since the first eight bits that are already received by the decompression engine 31 can only be used for decoding.

For example, if a 24-bit instruction word has been compressed to eight bits, the 8-bit index for the decompression table is formed by the four MSB bits of the incoming compressed word. The decompression table 40 is accessed and the corresponding address contents return the 24-bit instruction for the compressed eight bits. In other cases, the 32-bit compressed instruction stream may contain a portion of an instruction and the remaining portion of the instruction is in the next 32-bit compressed instruction word. In that case, the decoding logic 49 uses the 16-bit prev_decomp register 47 and the 16-bit prev_comp register 48 to store the previous portion of the instruction. The two-bit pre_part_set register 46 is used to indicate that there is a portion of the previous instruction stored. In addition, the 2-bit bytes_next register is used to indicate whether 8 or 16 bits of the prev_decomp register 47 and the prev_comp register 48 comprise the previous instruction. The dotted lines in FIG. 4 denote alternative paths for MUX selection or for copying data from the input stream to the output register 44 directly. Note that the second decompression table 41 is not accessed every cycle since there might not be two compressed instructions in one 32-bit word.

The heart of the decompression algorithm is handled by the tree logic. The tree receives instruction data from the cache (compressed) and produces a full word of data for the CPU. The invention assumes a word is n-bytes wide and that in general it can contain compressed and uncompressed instructions that can be 1, 2 . . . n bytes in length.

Figure 5:
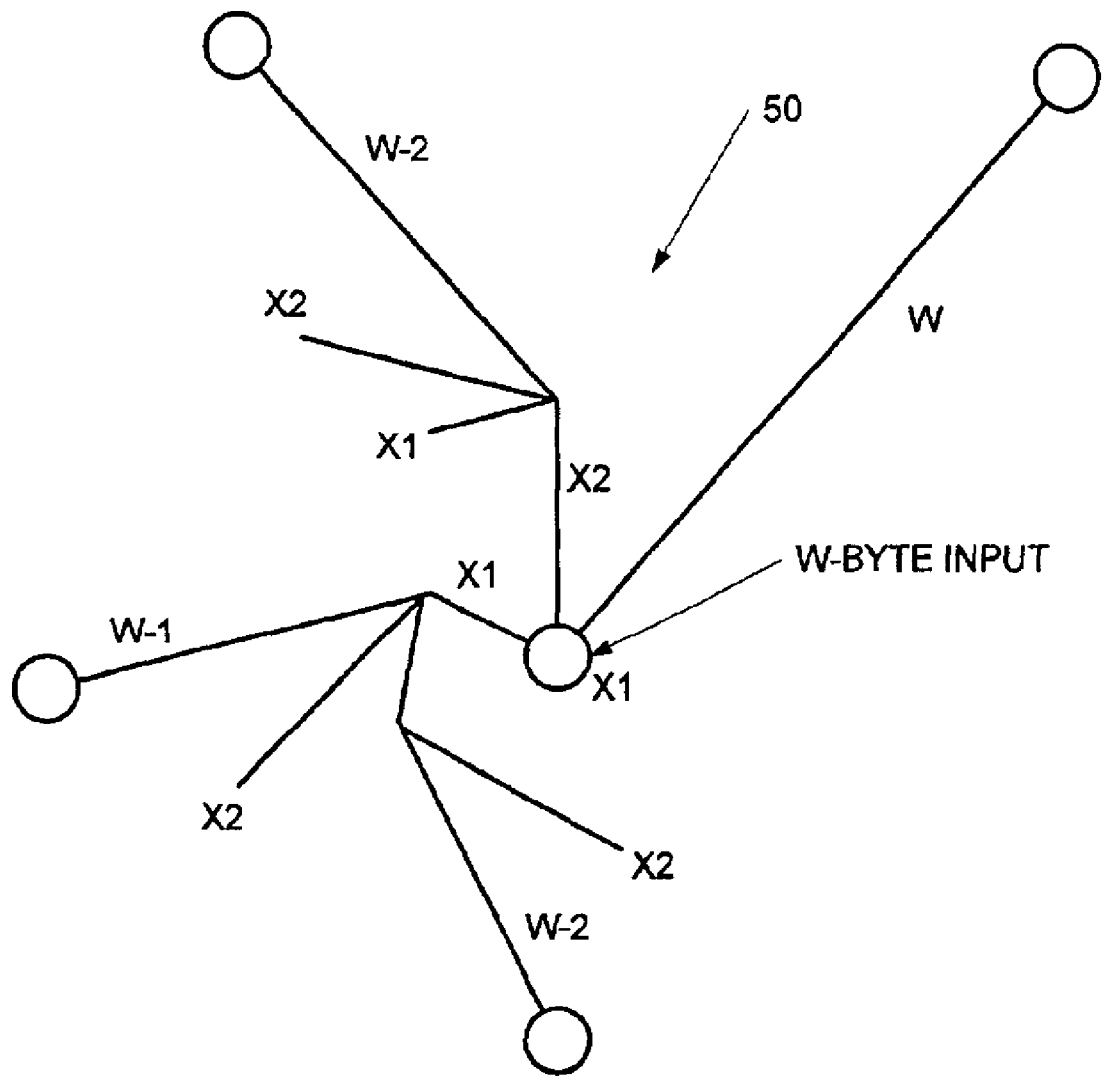
FIG. 5 illustrates a decompression tree according to the present invention.

The input to the algorithm is a W-byte word (compressed) fetched from the cache. The decompression tree 50 is illustrated in FIG. 5. It illustrates all the possible sequences of compressed instructions that can be subject to decompression by the decompression engine within any one cycle. The decompression tree 50 starts with branches corresponding to the instruction sizes. The root node is pointed to by the "W-byte input" arrow. It then continues with all cases until W bytes have been received (in certain cases some instruction combinations will not end on a W-byte word boundary). After decompression, any instructions/instruction parts that do not fit in a W-byte word boundary are buffered and sent to the CPU in the next cycle. The decompression tree 50 will reach terminal nodes (circles in FIG. 5) when W bytes have been collected to ensure that the CPU will always receive W-bytes per cycle.

At each node, all possible instruction sizes are shown that can possibly occur (i.e., X1, X2, . . . ).

Figure 6:
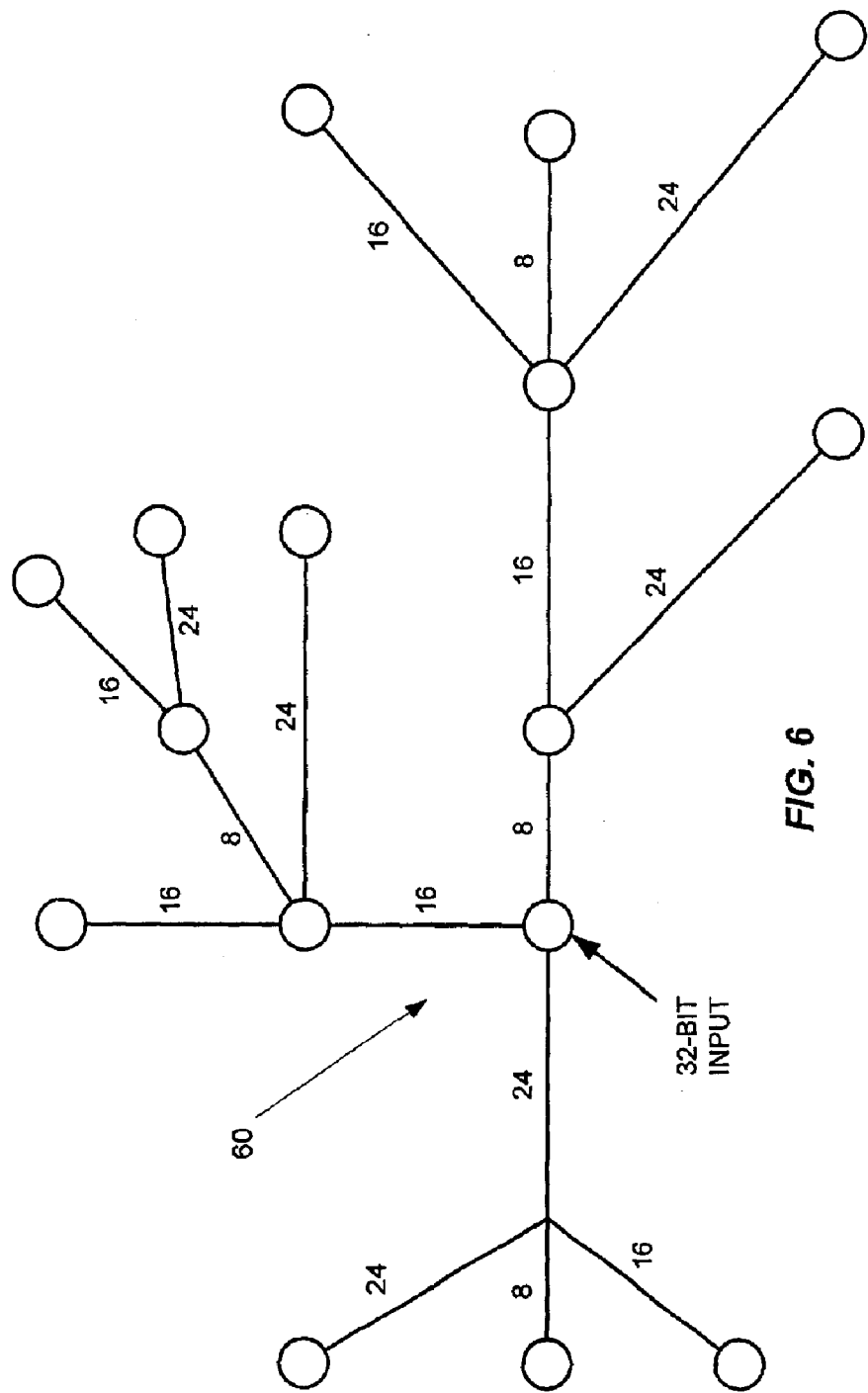
FIG. 6 illustrates an embodiment of the decompression tree of FIG. 5 according to the present invention using an exemplary instruction bit width.

Referring to FIG. 6, assume that W=32 and compressed instructions are 8 bits or 16 bits in size. Uncompressed instructions are 24 bits in size. The 24-bit instructions can be compressed into 8-bit or 16-bit instructions, and the CPU core uses a mixture of 16-bit and 24-bit instructions. Thus, there are only three different instruction sizes appearing in an actual compressed program. Hence, the decompression tree 60 starts with three branches corresponding to the three instruction sizes, i.e., 8-bit, 16-bit and 24-bit. The root node is pointed to by the "32-bit input" arrow. The decompression tree 60 then continues with all cases until 32 bits have been received (in certain cases some instruction combinations will not end on a 32-bit word boundary). After decompression, any instructions/instruction parts that do not fit in a 32-bit word boundary are buffered and sent to the CPU in the next cycle. The decompression tree 60 will reach the terminal nodes when at least 32 bits have been collected to ensure that the CPU will always receive 32 bits per cycle. This analysis can be used on other instruction formats as well.

Figure 7:
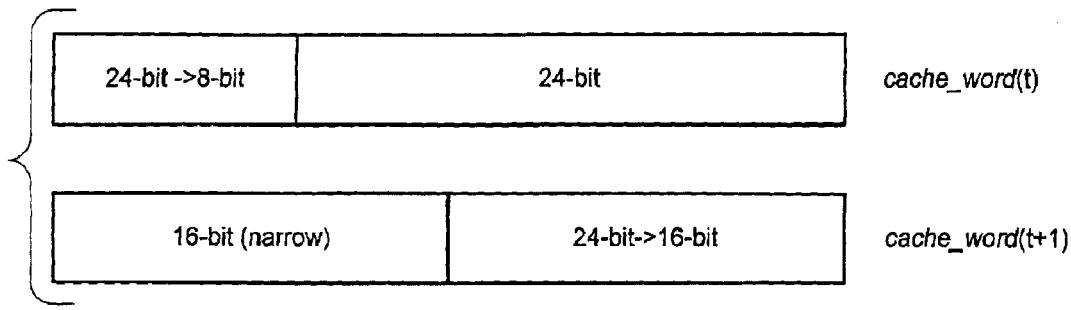
FIG. 7 illustrates an exemplary series of compressed and uncompressed instructions according to an embodiment of the present invention.

Referring to FIG. 7, and for purposes of illustrating the concepts of the invention, consider the following pattern of instructions coming from the instruction cache 32: a 24-bit instruction and a 24-bit instruction compressed to 8 bits (24→8) that comprise cache_word(t), and a 24-bit instruction compressed to 16 bits (24→16) and a 16-bit regular narrow instruction (16(n)) that comprise cache_word(t+1). These instructions would arrive at the decompression engine 31 in two cycles of 32-bit stream. In the first cycle, the decompression engine 31 receives cache_word(t), which is a 24-bit uncompressed and a 8-bit compressed instruction. Twenty-four bits of the first instruction form the 24 LSB bits of the outgoing bit stream to the CPU. The 8-bit compressed data is used to obtain the 24-bit instruction from the decompression table. The first byte of the resulting 24 bits from the decompression table is used to form the eight MSB bits of the 32-bit outgoing bit stream to the CPU. The remaining two bytes are stored in the prev_decomp register 47. The program counter dce_pc for the decompression engine 31 is incremented by four. In the second cycle, the decompression engine 31 receives cache_word (t+1), which is a 16-bit compressed instruction and a 16-bit regular narrow instruction. The decompression engine 31 assembles the 16 bits saved in the prev_decomp register 47 as the 16 LSB bits of the outgoing 32-bit stream. The 16 LSB bits of the incoming compressed instruction are used to obtain a 24-bit instruction from the decompression table. The resulting 16 LSB bits of the decompressed instruction's 24 bits are used to form the 16 MSB bits of the outgoing 32 bit-stream to the CPU, and the remaining one byte is stored in the prev_decomp register 47. The 16-bit regular narrow instruction from the cache memory is stored in the prev_comp register 48. The program counter dce_pc is incremented by four.

Figure 8:
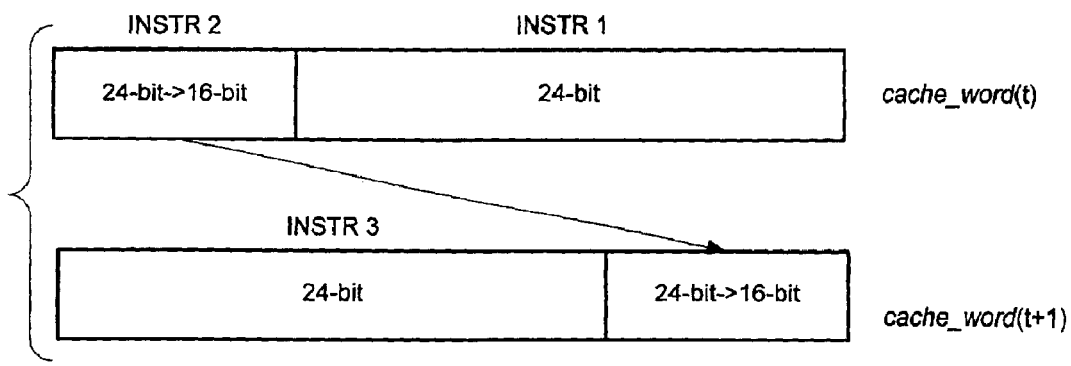
FIG. 8 illustrates an exemplary series of compressed and uncompressed instructions according to an embodiment of the present invention.
Figure 9:
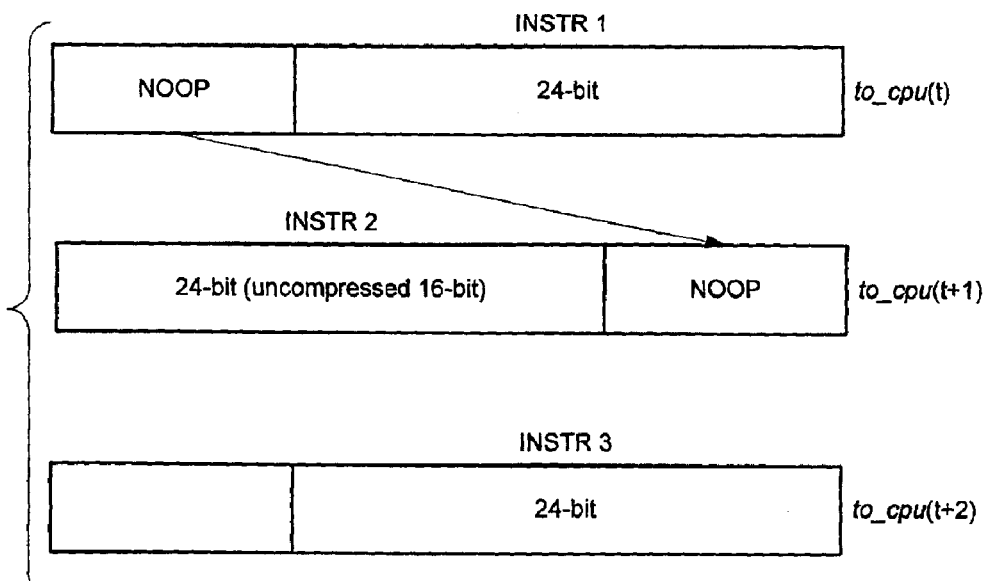
FIG. 9 illustrates an exemplary series of compressed and uncompressed instructions according to an embodiment of the present invention.

Referring to FIG. 8, in the example given, a problem occurs if a 32-bit compressed word cache_word(t) is fetched from the instruction cache 32 by the decompression engine 31 contains a 24-bit instruction plus a 16-bit compressed instruction (24→16). Although decompression engine 31 will know from the first four bits of the instructions that these two types of instructions have appeared, it will not be able to decompress the 16-bit instruction since it only has eight bits available. In other words, the decompression engine 31 receives only 32 bits per cycle from the instruction cache 32, and it will therefore have 24 bits of the uncompressed instruction plus eight bits of the compressed 16-bit instruction. The CPU cannot handle compressed instruction data even if it is a part of an instruction that is not going to be executed. Referring to FIG. 9, the decompression engine 31 sends the first part of a NOP (no operation) instruction with the 24-bit instruction in to_cpu(t). The remainder of the NOP instruction is stored in the prev_decomp register 47, while the prev_comp register 48 holds the full compressed 16-bit instruction. The decompression engine 31 then sends out as to_cpu(t+1) the full 24 bits of the compressed 24-bit instruction, along with the remainder of the NOP instruction from the prev_decomp register 47.

An important problem associated with code compression is how to locate branch/jump/call targets in compressed code since the original offsets will not point to "correct" locations after compression. In the following we will use the term branch loosely to mean any instruction that alters the program counter such as a call, a jump, etc.

One technique for locating compressed data was proposed by Lefurgy et al. When a branch instruction is executed, the decompression engine must be redirected to begin decompression at the branch target. Therefore, the mapping of native addresses to compressed addresses only occurs when a branch is executed. This allows the mapping information to be stored with the branch instruction itself. The technique changes the branch offsets in the original native branch instructions to point to the target instructions in the compressed address space, rather than the uncompressed space addresses of the original program. It involves the following steps:

1. Compress the original program and create a map between native instruction addresses and compressed instruction addresses. Avoid compressing branch instructions.
2. Use the map to patch the offset fields in the original branch instructions so they use offsets that correspond to the compressed addresses space.

Note that the invention avoids going through the above procedure a second time since it does not compress branches at all. Preferably, the dictionary is kept small and branches are not good candidates for inclusion in the dictionary. When the branch instruction is decompressed, the decompression engine sees a branch, but with an offset that corresponds to where the next compressed instruction is relative to the compressed address of the branch instruction.

One problem with this is that the original offset fields and compressed offset fields may assume different alignment between the original and compressed instructions. For instance, the original instructions may align to 4-byte boundaries, but the compressed instructions align to byte boundaries. In this case, the offset field really needs two more bits to have the same addressing range as the original program. In practice, this is rarely a problem because the size of the compressed program is less and the addressing range does not need to extend as far.

Decoding speed is not affected since there is no LAT to access, but usually the processor branch unit requires some modification. In some processors, byte-aligned instructions were supported and thus a branch target could reside on any byte boundary. This means that no modification in the CPU core was needed. Furthermore, removing the LAT improves the compression ratio. The main disadvantage of this method compared to the indexing table method is its lack of generality. The decompression unit has to be able to identify branch instructions and extract the offset. It is thus instruction set specific and will need some modification to work on different instruction sets.

An implication of using this technique is that the decompression engine must maintain its own program counter dce_pc. When the application starts execution, the dce_pc equals the CPU's program counter cpu_pc. As the execution progresses, the dce_pc diverges from the CPU's program counter. Incrementing the dce_pc is not always necessary because of compression: more instructions can fit in one 32-bit word and thus the data from the previous cycle may be used. Using a separate program counter for the decompression engine also means that cache hits or misses must be triggered according to the dce_pc value and not the cpu_pc value. The dce_pc will change value completely independently from the cpu_pc as the decompression engine keeps track of the instruction sizes it decompresses. The cpu_pc is only used when its current value is not just an increment of its previous value. This signals that a branch was taken. By that time, the decompression engine will already have the offset (branch instruction decoding is done a few cycles before a branch is taken) and will add it to the dce_pc.

Referring to FIG. 10, all the cases where the dce_pc does not change its value are illustrated. In all other cases, the dce_pc will be incremented by four. Incrementing the dce_pc is not always necessary because of compression, since more instructions can fit in one 32-bit word. Thus, the data from the prev_decomp and prev_comp registers may be used. Using a separate program counter for the decompression engine also means that cache hits or misses must be triggered according to the value of the dce_pc and not the value of the cpu_pc.

One potential problem is "unpredictable" cpu_pc behavior, which means that the values of the cpu_pc are not correlated with the program flow. This is due to internal effects in the CPU that, in general, may not be known to the system designer. On some processors, the cpu_pc may perform a replay function, wherein it will loop to a value it had a few cycles before when an instruction is stalling the pipeline, e.g., in the case of a load instruction. In order to handle such cases, the invention keeps a buffer of the most recent instructions and we are thus able to provide the CPU with data from previous cycles if requested.

The invention handles such "unpredictable" cpu_pc behavior in commercial CPU platforms having the pipeline replay feature. In this particular processor, replay means that certain instructions that have already been fetched are refetched when there is cache miss and data must be loaded from main memory.

The invention handles the replay function as follows: during execution the decompression engine identifies instructions that may cause a replay (e.g., loads and stores). The decompression engine stores their respective addresses (in compressed space) and their bit values in the replay buffer. A few cycles later, when the cpu_pc changes to value that is different than one instruction memory word plus its previous value, and its target points to an equivalent address location in the replay buffer, a replay is assumed and instructions are fetched from the replay buffer.

Figure 11A:
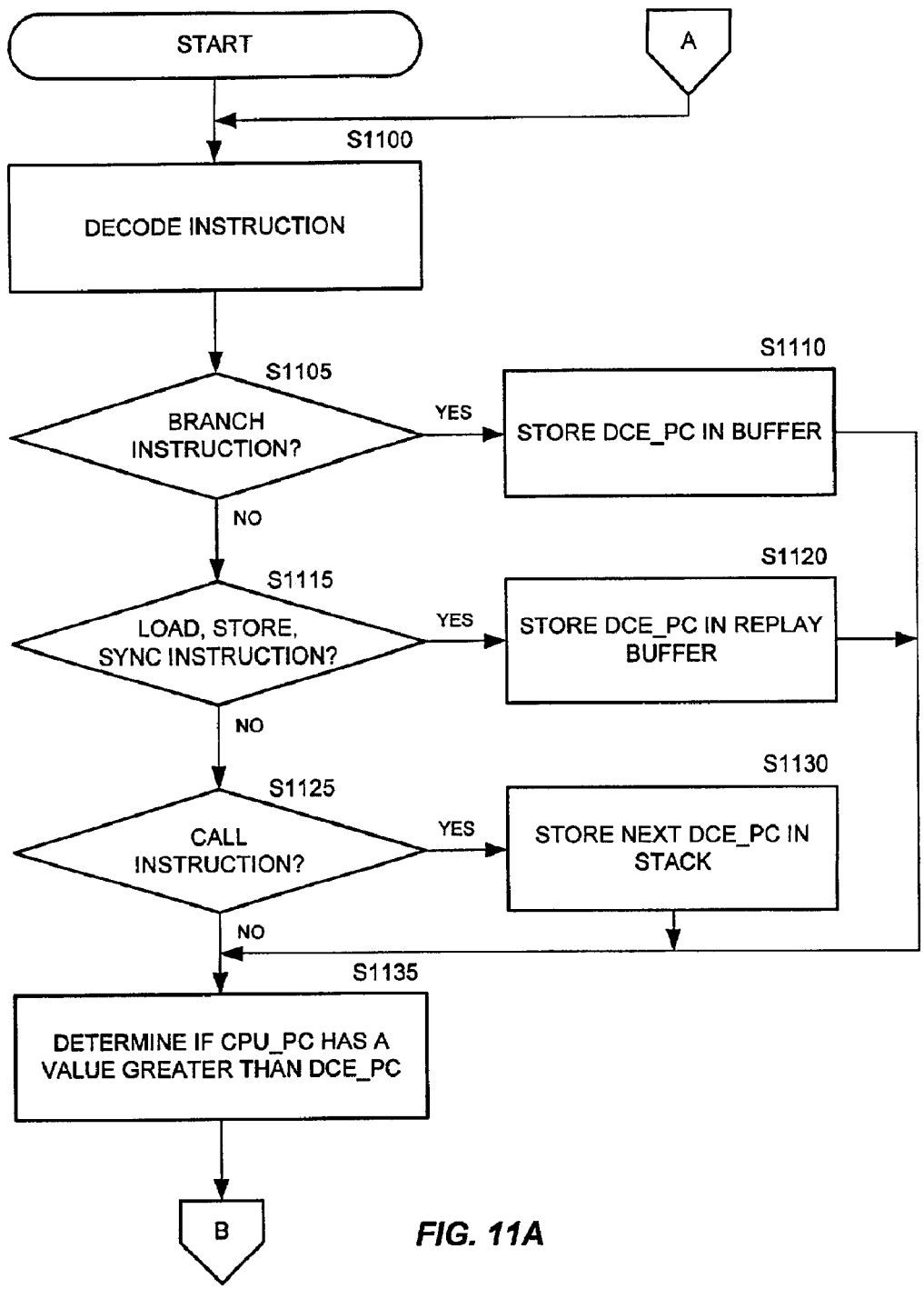
FIGS. 11A–11B illustrate an exemplary process flow for incrementing the instruction counter of a decompression engine according to the present invention.
Figures 11B, 12:
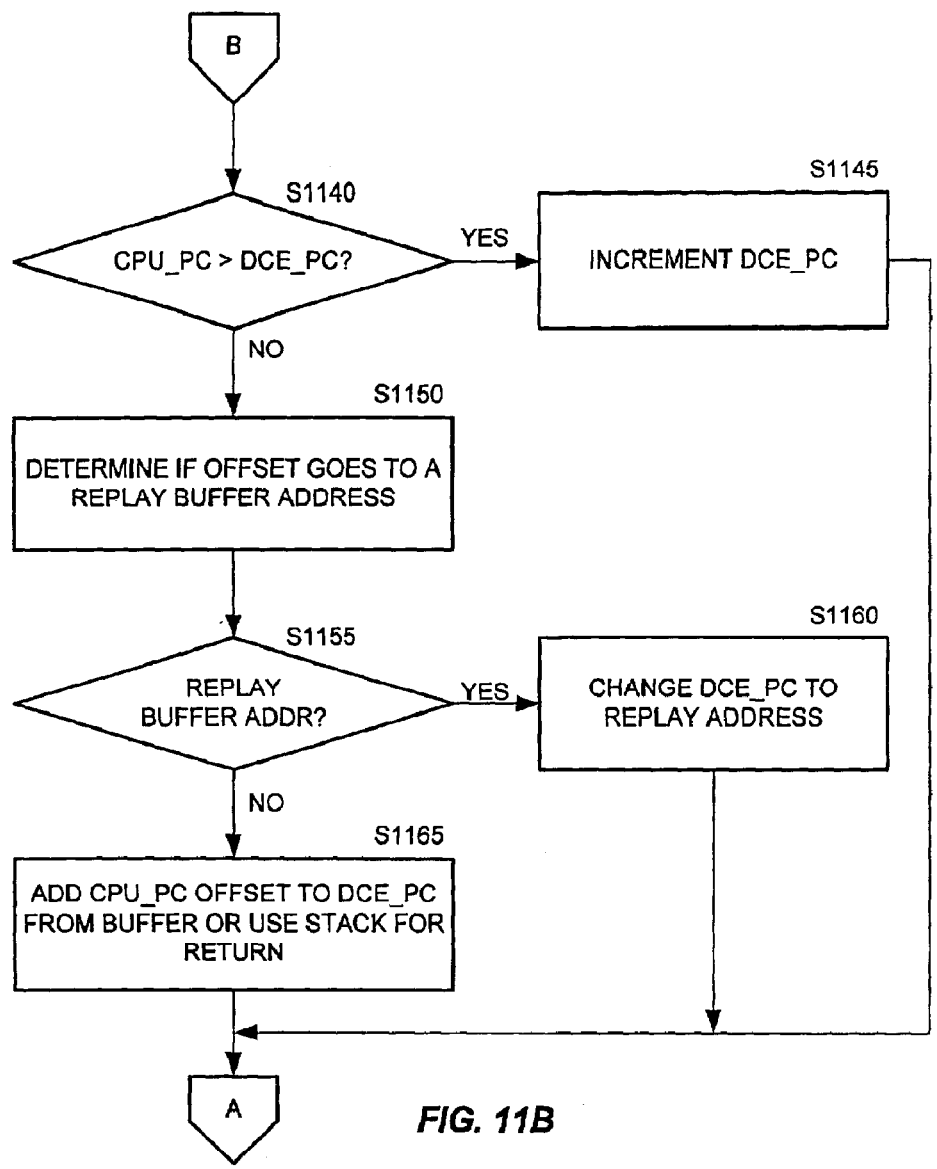
FIG. 12 illustrates an exemplary code fragment.

Referring to FIGS. 11A–11B, the behavior of the dce_pc is described. At S1100, the instruction words fetched from the instruction cache are decoded by the decompression engine. At S1105, a determination is made whether the instruction is a branch instruction. If that determination is true, then at S1110, the dce_pc is stored in a buffer. At S1115, a determination is made whether the instruction is a load, store or sync instruction. If that determination is true, then at S1120, the dce_pc is stored in a replay buffer. At S1125, a determination is made whether the instruction is a call instruction. If that determination is true, then at S1130, the dce_pc is stored on the stack.

At S1135, a determination is made whether the cpu_pc has a value greater than the dce_pc. If that determination is true, then the dce_pc is incremented. Next, a determination is made whether an cpu_pc offset goes a replay buffer address. If that determination is true, then at S1160 the dce_pc is changed to the replay address. Finally, at S1165, the cpu_pc offset to the dce_pc from the buffer, or use the dce_pc stored on the stack for returning.

Referring to FIG. 12, when the decompression engine sees the load instruction (132r), the decompression engine will store its address (40014f30) and its bit value in the replay buffer. The same thing will happen two cycles later for the store instruction (s32i). Four cycles later, the load instruction will execute its memory stage and a pipeline replay will be issued, assuming it is a cache miss. Consequently, the decompression engine will receive a cpu_pc that is not an increment of its previous value; instead, it points to four instructions earlier. The decompression engine knows this is a replay as it can calculate from the difference and the decompressed instructions size difference the corresponding dce_c. Since it has stored the address 40014f30 and its contents in the replay buffer, the decompression engine will serve the CPU from this buffer for the next four cycles until a) a second replay is issued which will repeat the previous procedure or b) the CPU continues with the fifth instruction (the return instruction). Subsequently, the CPU may return back to address 40014f35 to perform a replay for the store instruction. By keeping a buffer of the last four instructions, the invention can ensure that the CPU can be served with the instructions it requests at all times.

Holding a different program counter dce_pc for the decompression engine presents additional challenges. When a call instruction is executed, the decompression engine has to know where to return after the subroutine ends. Since calls can be nested, a stack similar to the CPU's stack is necessary. This stack holds values of the dce_pc that correspond to return addresses. Return instructions are detected by the decompression engine; once a return instruction is found the target address is retrieved from the stack. This is illustrated in FIGS. 11A–11B.

Figure 13:
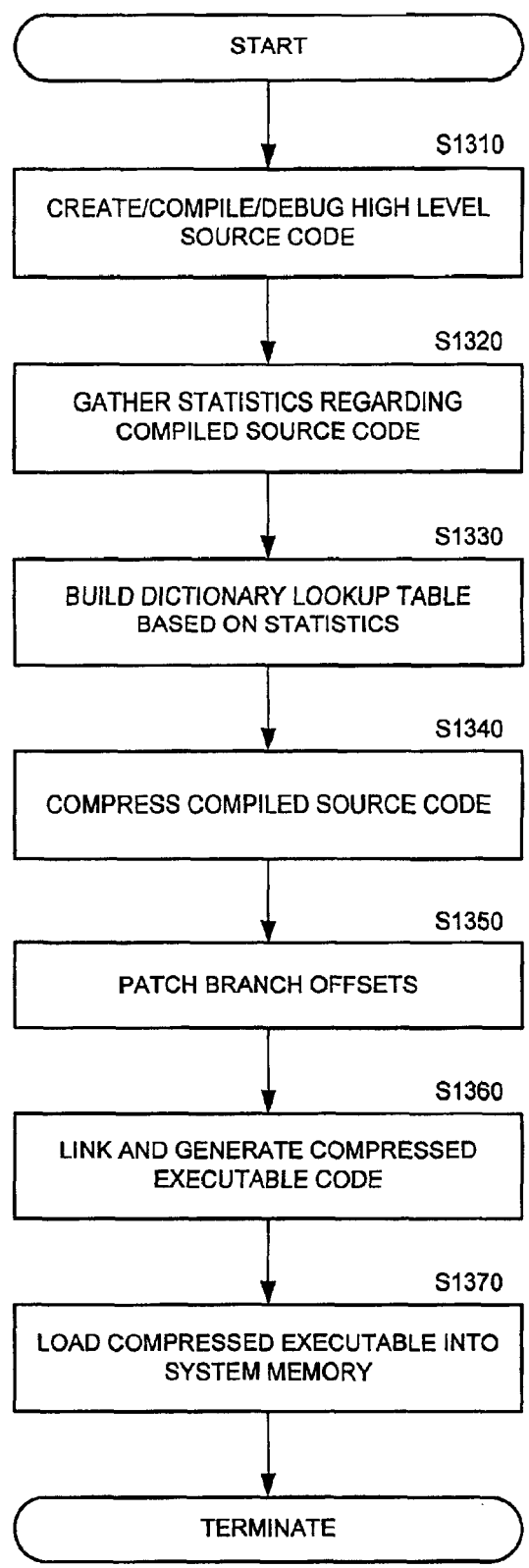
FIG. 13 illustrates an exemplary process flow for the development of compressed code and a decompression engine according to the present invention.

Referring to FIG. 13, a process flow for building the decompression engine and for generation of the compressed executable is illustrated. At S1310, high-level source code is created, complied and debugged. Once the development of the code is completed, at S1320, statistics are gathered to determine the most frequent instructions for inclusion in the decompression tables. At S1330, the most frequently appearing instructions are stored in the decompression tables, and, at S1340, the complied object code is compressed. At S1350, the branch/call/jump targets are patched accordingly. At S1360, the compressed code is linked and compressed executable code is generated. At S1370, the compressed executable code is loaded into the system memory. Note that although a new decompression table must be loaded in the decompression engine's memory every time a new application is compiled, there is no need to re-synthesize the decompression engine.

The foregoing description of the aspects of the present invention has been presented for purposes of illustration and description. It is not intended to be exhaustive or to limit the present invention to the precise form disclosed and modifications and variations are possible in light of the above teachings or may be acquired from practice of the present invention. The principles of the present invention and its practical application were described in order to explain the to enable one skilled in the art to utilize the present invention in various embodiments and with various modifications as are suited to the particular use contemplated.

Thus, while only certain aspects of the present invention have been specifically described herein, it will be apparent that numerous modifications may be made thereto without departing from the spirit and scope of the present invention. Further, acronyms are used merely to enhance the readability of the specification and claims. It should be noted that these acronyms are not intended to lessen the generality of the terms used and they should not be construed to restrict the scope of the claims to the embodiments described therein.

What is claimed is:

1. A one-cycle decompression engine, the decompression engine comprising:

a decoding circuit, wherein the decoding circuit receives compressed and uncompressed software instruction words;

at least two dictionary tables coupled to the decoding circuit;

an output register coupled to the decoding circuit and to the dictionary tables; and a plurality of registers coupled to the decoding circuit and to the output register.

2. The decompression engine as claimed in claim 1, wherein the dictionary tables are coupled to the decoding circuit by a plurality of multiplexers.

3. The decompression engine as claimed in claim 1, wherein uncompressed compressed instructions are stored in one of the plurality of registers prior to being forwarded to the output register.

4. The decompression engine as claimed in claim 1, wherein compressed instructions are stored in one of the plurality of registers prior to being forwarded to one of the plurality of multiplexers.

5. The decompression engine as claimed in claim 1, wherein the decompression engine further comprises a flag register that indicates if portions of compressed instructions or uncompressed instructions are stored in the plurality of registers.

6. A computer system comprising:

a decompression engine as claimed in claim 1;

a processing unit coupled to the decompression engine; and an instruction cache coupled to the decompression engine such that compressed or uncompressed instructions stored in the instruction cache pass through the decompression engine to the processing unit.

7. An embedded computer system, comprising:

a decompression engine as claimed in claim 1;

an embedded processor coupled to an interface bus and to the decompression engine;

a memory coupled to the interface bus; and an instruction cache coupled to the decompression engine.

8. The decompression engine as claimed in claim 1, wherein the decoding circuit implements a decoding tree algorithm in order to send a predetermined number of bits to a processing unit during one processing cycle.

9. The decompression engine as claimed in claim 8, wherein the predetermined number of bits is 32.

10. The decompression engine as claimed in claim 8, wherein the decoding circuit decodes multi-format instruction words.

11. The decompression engine as claimed in claim 10, wherein the decoding circuit controls the multiplexers coupled to the dictionary tables based upon instruction data input into the decoding circuit.

12. The decompression engine as claimed in claim 8, wherein the decoding circuit decodes 24-bit instructions, 24-bit instructions compressed into 8-bit instructions and 24-bit instructions compressed into 16-bit instructions.

13. A one-cycle decompression engine, the decompression engine comprising:

means for decoding input data, wherein the means for decoding receives compressed and uncompressed software instruction words;

means for storing decoded instructions coupled to the means for decoding;

output means coupled to the means for decoding and to the means for storing decoded instructions; and means for storing coupled to the means for decoding and to the output means.

14. The decompression engine as claimed in claim 13, wherein the means for storing decoded instructions are coupled to the means for decoding by means for multiplexing.

15. The decompression engine as claimed in claim 13, wherein uncompressed compressed instructions are stored in means for storing prior to being forwarded to the output means.

16. The decompression engine as claimed in claim 13, wherein compressed instructions are stored in the means for storing prior to being forward to the means for multiplexing.

17. The decompression engine as claimed in claim 13, wherein the decompression engine further comprises a flag means that indicates if portions of compressed instructions or uncompressed instructions are stored in the means for storing.

18. The decompression engine as claimed in claim 13, wherein the means for decoding implements a decoding tree algorithm in order to send a predetermined number of bits to a processing unit during one processing cycle.

19. The decompression engine as claimed in claim 18, wherein the predetermined number of bits is 32.

20. The decompression engine as claimed in claim 18, wherein the means for decoding decodes multi-format instruction words.

21. The decompression engine as claimed in claim 20, wherein the means for decoding controls the means for multiplexing coupled to the means for storing decoded instructions based upon instruction data input into the means for decoding.

22. The decompression engine as claimed in claim 18, wherein the means for decoding decodes 24-bit instructions, 24-bit instructions compressed into 8-bit instructions and 24-bit instructions compressed into 16-bit instructions.

23. A method for maintaining instruction counter coherency during decompression of compressed software instructions, wherein the method comprises:

determining if an uncompressed instruction is a predetermined type of instruction, and based on that determination, storing a decompression program counter in a predetermined memory location;

determining if the processor program counter is greater than the decompression program counter, and if that determination is true, incrementing the decompression program counter; and determining if the processor program counter offset points to a replay buffer address, and if that determination is true, changing the decompression engine program counter to be equal to the replay buffer address.

24. The method for maintaining instruction counter coherency as claimed in claim 23, wherein the predetermined instruction types are branch instructions, load instructions, store instruction, sync instructions and call instructions.

25. The method for maintaining instruction counter coherency as claimed in claim 23, wherein if the uncompressed instruction is a branch instruction, the decompression program counter is stored in a buffer.

26. The method for maintaining instruction counter coherency as claimed in claim 23, wherein if the uncompressed instruction is a load, store or sync instruction, the decompression program counter is stored in a replay buffer.

27. The method for maintaining instruction counter coherency as claimed in claim 23, wherein if the uncompressed instruction is a call instruction, the decompression program counter is stored in the stack.

28. A method for handling compressed and uncompressed software instructions of various bit sizes, wherein the method comprises:

constructing a decompression tree having a root and a plurality of branches extending from the root, each branch having a branch end;

receiving at least first and second software instructions at the root of the decompression tree;

determining the bit size of the first software instruction, and traversing a branch of the decompression tree that corresponds to the bit size of the first software instruction;

determining the bit size of the second software instruction, and traversing the decompression tree down a branch that corresponds to the bit size of the second software instruction;

determining if a branch end has been reached, and if that determination is true, decoding the software instructions; otherwise, additional software instructions are received until a branch end is reached.

29. The method for handling compressed and uncompressed software instructions as claimed in claim 28, wherein constructing a decompression tree further comprises:

determining the number of bits in each instruction code size;

adding a first branch layer to the root of the decompression tree for each instruction code size, such that each branch is assigned a length that corresponds to the instruction code size; and adding additional layers of branches to the first branch layer until a bit distance from each branch end to the root of the decompression tree is equal to or greater than a predetermined bit amount.

30. The method for handling compressed and uncompressed software instructions of various bit sizes as claimed in claim 29, wherein the predetermined bit amount is 32.

* * * * *